Sept. 6, 1927.  1,641,779
J. H. PACE
CONTROLLING DEVICE FOR MOTOR VEHICLES
Filed Jan. 14, 1927   2 Sheets-Sheet 1
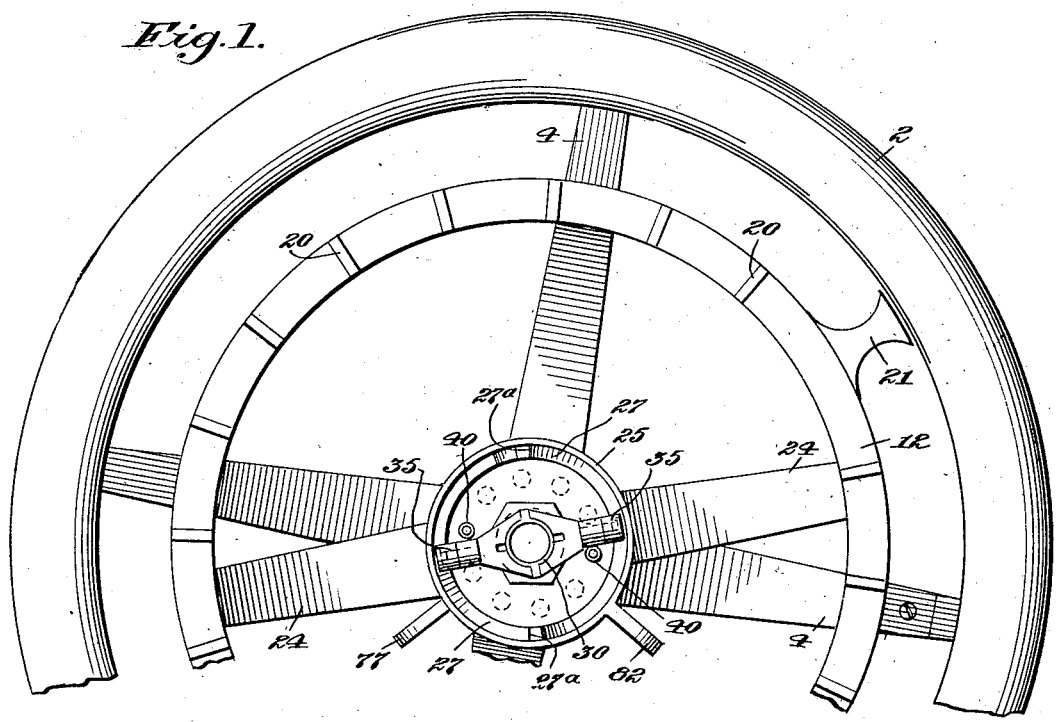
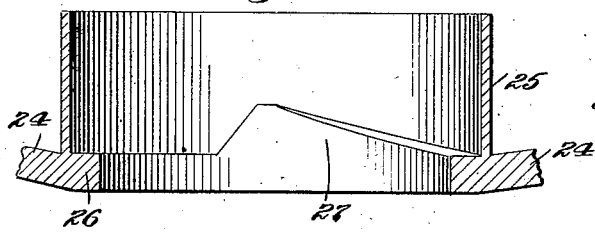
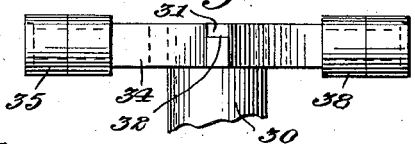
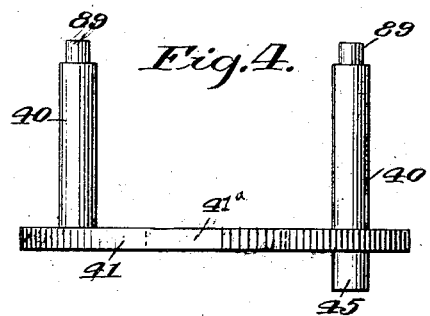
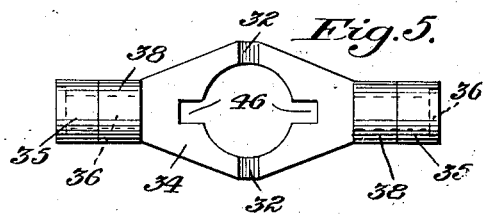
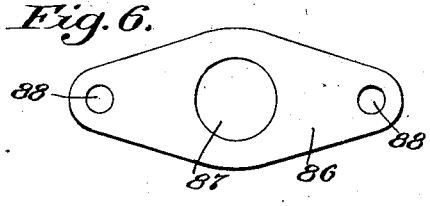
Inventor:
J. H. Pace, Sept. 6, 1927.
J. H. PACE
1,641,779
CONTROLLING DEVICE FOR MOTOR VEHICLES
Filed Jan. 14, 1927    2 Sheets-Sheet 2
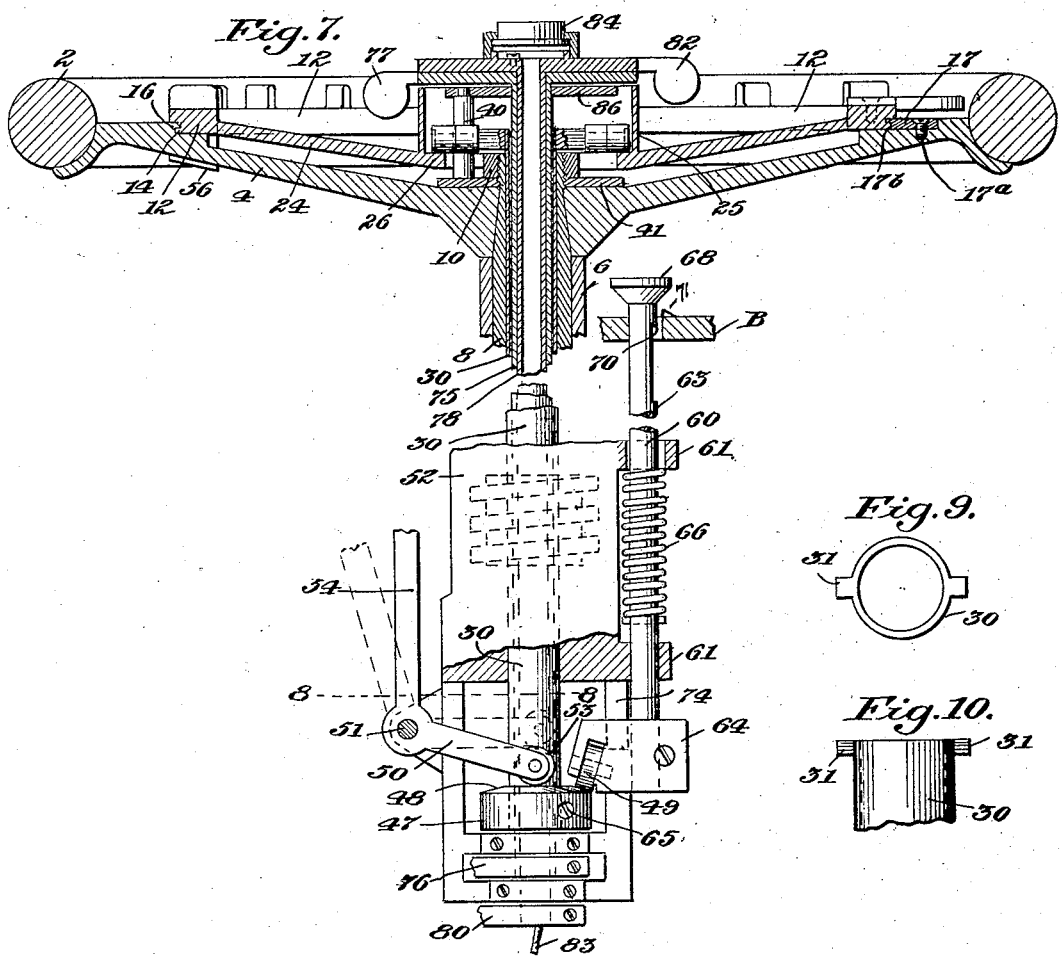
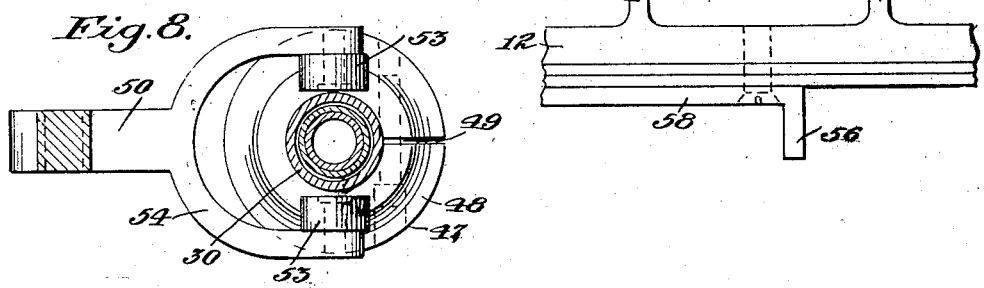
Inventor:
J. H. Pace, Patented Sept. 6, 1927.

1,641,779

UNITED STATES PATENT OFFICE.

JAMES HARALSON PACE, OF SCOTTDALE, GEORGIA.

CONTROLLING DEVICE FOR MOTOR VEHICLES.

Application filed January 14, 1927. Serial No. 161,173.

This invention relates to controlling devices for motor vehicles of the type where the controls are located on the steering wheel, the invention being an improvement upon the gas controlling mechanism disclosed in U. S. Letters Patent No. 1,556,302, granted to me October 6, 1925.

As covered by said prior patent, the present invention is characterized by a gas controlling device comprising a ring mounted on the steering wheel for rotary motion with said wheel during the steering of the vehicle, but capable of independent movements for controlling the supply of gas to the motor, which are imparted to the ring by the operator's hand. By such construction when the operator of the vehicle grasps the rim of the steering wheel in the act of guiding the car his thumb extends to the control ring which, when moved with the steering wheel in the latter's rotary movements does not affect the gas supply, but when moved by the thumb independently of the movement of the steering wheel, controls such supply.

The advantages of the device referred to comprise safety and satisfactory control of the gas supply, which is secured by the thumb of either hand, in any position of the rim of the steering wheel while the remainder of the same hand maintains a firm grip on the steering wheel in guiding the car. In conjunction with this means for controlling the gas supply, a foot control may be used, if desired, although such is not necessary. The presence, however, of such foot control may be of advantage in that it gives confidence to the driver, and provides a secondary control with which he is already familiar while learning to operate the improved hand control.

In addition to the foregoing advantages, the hand control referred to relieves the driver of the tiresome strain due to pressing down upon a foot lever for a long period of time; it furthermore leaves the right foot free for exclusive use for instant application of the foot brake, obviates the danger of mistaking the foot throttle control for the brake which results sometimes in accidents, relieves the motor from shocks transmitted to it from the foot through the foot control pedal, when riding over rough roads, and permits the supply of gas to the motor with the utmost precision and uniformity, regardless of the roughness of the road being traveled. Furthermore, the said hand control device remains in the position of adjustment to which it has been moved and does not spring back like a foot control lever, which increases the reliability of the control of the hand operated device. The present embodiment of the invention dispenses with that construction in which a rod passes through the steering post, and is connected by means of a lever mounted on the spoke of a steering wheel to near a single point of the circumference of the control ring, said rod and lever being subjected to the pressure of the carbureter spring, and serving to hold the control ring against the steering post at a single point. Under the present invention the pressure of the carbureter spring is applied to the controlling ring simultaneously at diametrically opposite points, thereby equalizing the pressure of the ring against the steering wheel, which is a better mechanical construction than the former one, as will be obvious. As illustrated, such equalized pressure is applied through oppositely extending rollers, connected with a tube passing through the steering wheel post, and having a connection at its lower end with a lever or other device, for operating the carbureter valve. Reliability of operation, equalization of pressures, and improved efficiency of control, follow from these features.

Another improved feature is comprised in means, whereby the operator may change from hand control, to foot control of the gas supply when desired, and without releasing the pressure which is ordinarily exerted through the gas controlling tube and rollers, heretofore referred to, to the controlling ring for pressing the latter against the steering wheel. The instrumentality referred to includes a spring-pressed rod, having connection with a roller which bears upon a member connected with the lower end portion of the gas control tube. Release of the spring-pressed rod from a position in which the roller is prevented from bearing against said member, results in the application of a yielding pressure to the member, when the lever which is connected to the carbureter, and ordinarily is spring-pressed against the aforesaid member, is lifted from the member through the operation of the pedal when the latter opens the throttle as the result of foot pressure. In addition to the foregoing features the invention includes additional controls through telescopic tubes which are housed within the steering post, and are connected, respectively, with such controls as the lights and the ignition, whereby said elements may be independently operated by suitable levers which are mounted on the steering wheel.

The foregoing, and other valuable features of the invention, including improved details of construction and combinations of elements will be better understood from the following description when considered in connection with the accompanying drawings, in which:—

Fig. 1 is a plan view of a portion of a steering wheel with the invention applied;

Fig. 2 is a transverse sectional view, enlarged, as compared with Fig. 1, showing one of the operating cams and the hub of the control ring;

Fig. 3 is a side view of the top portion of the gas control tube and its roller member;

Fig. 4 is a side elevation of the limit post disk;

Fig. 5 is a plan view of the gas control tube roller member;

Fig. 6 is a plan view of the tube holder;

Fig. 7 is a plan view, partly in transverse section of the steering wheel and controls, said view showing also, in elevation, the lower end portion of the controlling tubes, with the means for permitting change to foot control;

Fig. 8 is a sectional plan view on the line 8—8 Fig. 7 with certain parts removed;

Fig. 9 is a plan view of the upper end of the gas control tube;

Fig. 10 is a side elevation thereof; and

Fig. 11 is a schematic fragmentary view in side elevation, showing a portion of the control ring with its limiting stop.

Referring to Figs. 1 and 7, a steering wheel 2, having the usual spokes 4, has an outside casing 6 within which is located the steering post 8. The steering post is secured to the steering wheel by a nut 10 threaded upon the upper end of the tubular post 8.

As herein shown, the controlling ring 12 is supported upon the spokes 4 of the steering wheel concentrically with the latter, leaving a space between the steering wheel and controlling ring. The latter is provided with a rib 14 which is guided in part by grooves 16, preferably formed integral with all of the spokes 4 except one, in which latter I may employ a plate 17, detachably secured to the spoke by a screw 17$^a$, the forward edge of said plate being provided with an offset portion 17$^b$ to form with the under surface of the spoke, a groove, like the other grooves 16.

The controlling ring 12 may be provided with a plurality of projections 20, whereby the ring may be better engaged by the operator's hand, and said ring is furthermore provided with a thumb piece 21 for manipulation. The controlling ring is provided with a bar 24 from which rises a cylindrical hub 25 which latter is provided with an inner annular edge 26, and rising therefrom are two spiral cams 27, 27, which rise from low points to diametrically opposite high points 27$^a$. Concentrically arranged within the steering post 8 is the gas control tube 30 which is provided at its upper end with diametrically extending lugs 31, which latter are adapted to be seated in notches 32 formed in the roller member 34. The roller member carries oppositely extending spindles 36, upon the outer end portions of which are journalled anti-friction rollers 35, which are seated upon the cams 27. The roller member is furthermore provided with rollers 38, also journalled upon the spindles 36, but arranged inside of the rollers 35. The rollers 38 bear against the limit posts 40, which latter project upwards rigidly from a limit post disk 41. This limit post disk is provided with a central aperture 41$^a$, and said disk is located on top of the steering wheel hub, and has a downwardly projecting pin 45 which enters a hole in the hub, and prevents rotation of the disk. The aperture 41$^a$ surrounds the steering post 8, as shown in Fig. 7, and the nut 10 which is threaded to the steering post clamps the limit post disk to the hub.

The roller member 34 is provided with two diametrically disposed openings 46, which are arranged about 90 degrees apart from the open notches 32 and in assembling the parts the lugs 31 on the tube 30 are first passed upward through the openings 46 and are then turned relatively to the member 34, and the lugs are caused to enter the notches 32 in the member, thus firmly locking the gas control tube and the roller carrying member together.

When the gas control tube with the roller member thus mounted on its upper end is placed in the hole in the steering post, as shown in Figs. 1 and 7, the rollers 35 rest on the lowest parts of the spiral cam surfaces 27, the throttle controlling the flow of gas from the carburetor to the motor is closed. At the lower end of the gas controlling tube 30, the mechanism connecting said tube with the carburetor is shown, see Figs. 7 and 8. A split collar 47 having a beveled upper face 48, is clamped to the tube 30 by a screw 65 which enters a threaded aperture through the split portion of the collar, said screw being preferably also received in a groove formed in the tube 30, whereby the collar is prevented from moving longitudinally relatively to said tube. A lever 50, fulcrumed at 51 upon an extension of the worm gear casing 52 carries at its inner forked ends 50 rollers 53 which are caused to bear down and exert pressure upon the collar 47 through the usual carbureter spring acting upon the other arm, 54, of the lever 50.

The tension of the carbureter spring acting through the parts described presses the gas controlling tube downward bringing with it the roller member 34, so that the outer rollers are caused to press against the cams 27. When the pressure of the operator's thumb is exerted against the thumb piece 21, Fig. 1, or the thumb grips 20 on the upper surface of the control ring, rotary movement is thus imparted to the cams which causes the roller member carrying the tube 30 to rise, the rollers 38 at such time bearing against and being guided by the posts 40. The upward movement of the tube will, through the instrumentality of the collar 47, and lever 50 open the carbureter valve more or less, according to the extent of upward movement which is imparted to the tube 30, and a reverse movement of rotation of the control ring 12 will permit the tube 30 to move downwardly under the pressure of the carbureter spring exerted through the lever 50 and collar 47. The control of the supply of gas to the motor is by the means described effected merely through movement of the controlling ring, in either direction, by pressure applied by the operator's thumb, such movements being independent of the steering movements of the steering wheel 2. The controlling ring, being freely rotatable upon the steering wheel to effect opening and closing movements of the throttle, is through the action of the carbureter spring, pressed yieldingly downward against the spokes of the steering wheel, and the rollers 35 are yieldingly maintained by said spring in engagement with the cam surfaces of the cam 27.

As shown in Figs. 7 and 11, the controlling ring 12 has secured to its under surface a downwardly projecting finger, or fingers 56 which are bent angularly from a plate 58 secured to the under surface of the ring by a screw, or otherwise. The finger 56 acts as a stop for the control ring, to limit the rotary movement of the ring by coming in contact with one of the spokes 4 of the steering wheel, as will appear from Fig. 7. The control ring may be provided with a plurality of holes on each side of the stop with filling screws placed therein until needed, so that the stop or stops may be supported at different positions, as desired on the control ring, the stops being held in place by screws and provided with any suitable cushioning device to absorb the shock of contact with the spoke.

The worm gear casing 52 is herein shown as provided with projecting perforated portions 61 which form guides for a reciprocable rod 63 which has clamped to its lower end a block 64, carrying a roller 49 which latter may be caused to bear upon the upper beveled face 48 of the collar 47. The spiral spring 66 surrounding the rod 63, is confined between the upper perforated portion 61 and a pin carried by the rod, and tends to exert a pressure on the rod and block 64, and thence on the collar 47. This device acts to maintain pressure on the rollers 35 and hold them against the face of the cam 27, when such downward pressure which is normally maintained by the carbureter spring, is released as the result of pressure exerted on the foot control pedal, for the carbureter. The rod 63 is provided at its upper end with a button 68, and said rod has a pawl point 70 to engage a tooth 71 projecting from the edge of an opening through the instrument board B, through which opening the rod 63 passes.

When, by the knob 68, the rod 63 is pulled upwardly and laterally to permit the pawl point 70 to engage the tooth, the roller 49 will be out of engagement with the collar, and the rollers 53 of the lever 50 only will bear against the collar, said rollers being free to travel over the upper edge of the collar during the turning of the steering post and tube 30, without interference with the reciprocating movements of the tube incident to the gas control. When the foot throttle control is being used and the rollers 53 are removed from their pressure-engagement with the collar 47, the operator may release the pawl 70 from engagement with the tooth 71, thus permitting the roller 49 to be spring-pressed against the collar, and substituted for the pressure which was formerly applied thereto by the rollers 53. The casing 52 is provided with downwardly projecting portions 74 which act as guides for the block 64 and hold the latter and the rod 60 from turning during the turning movements of the collar 47.

As herein shown, additional controls, for the lights and the spark are carried by the steering post, and in the present case a tube 75, arranged concentrically within the tube 30, has connection with a lever 76 at its lower end for controlling the lights, the upper end of the tube 75 being provided with a lever 77, for movement by the thumb of the operator. Concentrically arranged within the tube 75 is still another tube 78 which through a lever 80 at its lower end is connected suitably with devices for controlling the spark, the upper end of this tube having connected thereto a lever 82 which may be manipulated by the thumb of the operator. A wire 83 is shown extending from the lower end of the innermost tube for conveying current to the horn, and current through this wire to the horn is controlled by the usual horn button 84. Fig. 6 shows a tube holder or plate 86, provided with a central aperture 87 through which pass the upper ends of the tubes 75, 78, said plate being furthermore provided with holes 88 which pass over the reduced portions 89, of the posts 40. The plate 86 thus maintains rigidly the upper ends of the concentric tubes in position, and prevents them from being bent or diverted out of a straight line, and thus interfering with the free reciprocating movements of the gas control tube 30.

It will be observed that the means for communicating pressure from the carbureter spring to the controlling ring, through the roller member 34 and rollers 35 equalize the downward pressure of said ring on the spokes of the steering wheel. Such equalization of pressure of course is accomplished through the two-part bar 24 connecting the hub 25 with the ring. This is an important feature, and is an improvement over the construction shown in my prior patent.

From the foregoing it is believed that the operation of the various parts of my improved controlling mechanism will be understood without further description, and the right is reserved to make such changes in the size or proportions of the parts, or in the details of the construction illustrated as are contemplated by the invention, and which would not depart from the terms of the following claims.

I claim:

1. In a controlling device for motor vehicles, comprising in combination with the steering wheel of the vehicle, of a controlling ring rotatably supported on said steering wheel, and connections whereby said ring controls the gas supply, said connections including means for applying pressure yieldably to force said ring against the spokes of the steering wheel at diametrically opposite points.

2. A controlling mechanism comprising in combination with the steering wheel of the vehicle, of a ring supported on said steering wheel for turning movements within it, and capable of turning movements independently of the steering wheel, connections between said ring and the gas supply regulating device of the motor, and means in said connections for applying an equalized pressure to said ring to press the ring against the spokes of the steering wheel.

3. A controlling mechanism for motor vehicles, comprising in combination with the steering wheel of the vehicle, of a controlling ring supported for turning movements within said steering wheel, cams carried by said ring, a gas control tube mounted for reciprocation in the steering post, a roller-carrying member connected with said tube, and rollers on said member arranged to engage said cams.

4. A controlling device for motor vehicles comprising the combination with a steering wheel, of a ring mounted within said wheel and supported rotatably upon the spokes thereof, oppositely disposed spiral cams supported by said ring, a gas control tube mounted for reciprocation in the steering post and having connection with the carbureter controlling lever, a roller-carrying member connected with said tube, diametrically disposed rollers on said member arranged for engagement with said cams, and means for guiding said rollers vertically as the latter rise and fall on the cams to reciprocate the gas control tube.

5. A controlling mechanism for motor vehicles, comprising in combination with the steering wheel of the vehicle, of a ring supported on said wheel for turning movements, spiral cams carried by said ring, rollers mounted on said cams, a gas control tube mounted for reciprocating movements in the steering post and having diametrically disposed lugs, a roller member supporting said rollers having an opening to receive the end of the tube, slots on opposite sides of the opening and notches spaced from said slots, the lugs arranged for passing through the slots and engagement with the notches, whereby said tube may be inserted in and connected with said member.

6. A controlling mechanism for motor vehicles, comprising in combination with a steering wheel of the vehicle, of a ring supported for turning movements within said wheel, a gas control tube, connections between said tube and ring for reciprocating the tube, yielding means, including a lever normally under pressure of the carbureter spring and whose pressure is relieved when the usual foot operated throttle control is depressed, for pressing said ring against the spokes of the steering wheel, and independent means arranged to be brought into action to substitute the first mentioned means, and thereby continue the application of yielding pressure to the ring.

7. A controlling mechanism for motor vehicles, comprising in combination with the steering wheel of the vehicle, of a ring supported for turning movements within said wheel, cams carried by the ring, a gas control tube mounted in the steering post, a member on said tube having rollers engaging said cams, a rotary member carried by said tube, a gas controlling lever having connection with the usual carbureter spring and provided with a roll to press against said rotary member and through the tube and rollers to press said ring against the spokes of the steering wheel, and a spring-pressed roller arranged normally out of engagement with said rotary member, but constructed to be released to engage said member and substitute the pressure of the usual carbureter spring during the operation of a gas foot control.

8. A controlling mechanism for motor vehicles, comprising in combination with the steering wheel of a vehicle, of a ring mounted within said wheel and supported rotatably upon the spokes thereof, a controlling tube mounted in the steering post, operative connections between said ring and tube for reciprocating the latter, and a plurality of additional tubes concentrically arranged relative to the first-named tube, said additional tubes constructed to control such functions as the spark and lights, and operating means for the control tubes carried by the steering wheel.

9. A controlling mechanism for motor vehicles, comprising in combination with the steering wheel of a vehicle, of a ring mounted within said wheel and supported rotatably upon the spokes thereof, a gas controlling tube mounted for reciprocating movements in the steering post, means for imparting said movements to the tube through said ring, a rotatable tube supported in said steering post concentrically with said first-mentioned tube and connections from said rotating tube to the spark for adjusting the latter, and a tube concentrically arranged within the steering post for rotation therein and arranged to control the lights, and means located on the steering wheel for independently operating said rotatable tubes.

10. A controlling mechanism for motor vehicles, comprising in combination with the steering wheel of a vehicle, of a ring supported upon the spokes of said steering wheel for rotation independently of the rotation of said wheel, a housing supported by said ring, spiral cams within said housing, a controlling tube mounted to reciprocate within the steering post, a transverse member connected with said tube and having anti-friction rolls engaging said cams, other anti-friction rolls carried by said member, limit posts supported by the steering wheel and engaged by the last mentioned rolls, other tubes arranged concentrically within the steering post, a plate supported upon said limit posts and provided with an aperture to receive the last named tubes and hold them in vertical alinement, said last named tubes being arranged for controlling extra functions, such as the spark and lights.

In testimony whereof I have hereunto set my hand this 3rd day of January, A. D. 1927.

JAMES H. PACE.